(12) United States Patent
Di Ronza et al.

(10) Patent No.: US 8,997,814 B2
(45) Date of Patent: Apr. 7, 2015

(54) MIX FOR OUTER TYRE PORTIONS OF IMPROVED APPEARANCE

(75) Inventors: Raffaele Di Ronza, Rome (IT); Valeria Grenci, Rome (IT)

(73) Assignee: Bridgestone Corporation, Tokyo (JP)

( * ) Notice: Subject to any disclaimer, the term of this patent is extended or adjusted under 35 U.S.C. 154(b) by 20 days.

(21) Appl. No.: 13/814,883

(22) PCT Filed: Aug. 16, 2011

(86) PCT No.: PCT/IB2011/001886
§ 371 (c)(1),
(2), (4) Date: Apr. 15, 2013

(87) PCT Pub. No.: WO2012/023026
PCT Pub. Date: Feb. 23, 2012

(65) Prior Publication Data
US 2013/0186544 A1  Jul. 25, 2013

(30) Foreign Application Priority Data

Aug. 16, 2010 (IT) .............................. TO2010A0701

(51) Int. Cl.
| | | |
|---|---|---|
| C08K 5/092 | (2006.01) | |
| C08L 9/00 | (2006.01) | |
| C08L 7/00 | (2006.01) | |
| C08L 21/00 | (2006.01) | |
| B60C 1/00 | (2006.01) | |

(52) U.S. Cl.
CPC ... *C08L 9/00* (2013.01); *C08L 7/00* (2013.01); *C08L 21/00* (2013.01); *B60C 1/0025* (2013.01)

(58) Field of Classification Search
CPC ............. C08L 9/00; C08L 7/00; C08L 21/00; C08L 91/06; C08L 2666/02; F04D 27/0246; F04D 19/042; F04D 19/044; B60C 1/0025; B60C 1/00
USPC .......................................... 152/564; 524/322
See application file for complete search history.

(56) References Cited

U.S. PATENT DOCUMENTS

| | | | | |
|---|---|---|---|---|
| 3,808,080 A | * | 4/1974 | Parry .............................. | 156/580 |
| 3,826,735 A | * | 7/1974 | Shinomura ..................... | 208/21 |
| 4,877,456 A | * | 10/1989 | Chikamune et al. .......... | 106/270 |
| 5,284,896 A | | 2/1994 | Shimada et al. | |
| 5,296,129 A | * | 3/1994 | Ikeda et al. .................... | 208/20 |
| 6,201,049 B1 | | 3/2001 | Sakamoto et al. | |
| 2006/0124218 A1 | | 6/2006 | Nahmias Nanni et al. | |
| 2010/0163150 A1 | * | 7/2010 | Hirayama et al. ............ | 152/532 |

FOREIGN PATENT DOCUMENTS

| | | |
|---|---|---|
| EP | 0 490 533 A1 | 6/1992 |
| EP | 1 876 037 A1 | 1/2008 |
| EP | 2 157 128 A1 | 2/2010 |
| JP | 11-181150 A | 7/1999 |
| JP | 2000-86824 A | 3/2000 |
| WO | WO 2008/149588 * | 12/2008 |

OTHER PUBLICATIONS

International Search Report for PCT/IB2011/001886 dated Mar. 28, 2012.

* cited by examiner

*Primary Examiner* — Mark Eashoo
*Assistant Examiner* — Marilou Lacap
(74) *Attorney, Agent, or Firm* — Sughrue Mion, PLLC

(57) ABSTRACT

A tire mix containing a cross-linkable, unsaturated-chain polymer base, curing agents, a reinforcing filler, and wax; the wax containing a paraffin wax containing a maximum of 45% by weight of normal paraffin.

5 Claims, No Drawings

MIX FOR OUTER TYRE PORTIONS OF IMPROVED APPEARANCE

CROSS REFERENCE TO RELATED APPLICATIONS

This application is a National Stage of International Application No. PCT/IB2011/001886 filed Aug. 16, 2011, claiming priority based on Italian Patent Application No. TO2010A000701 filed Aug. 16, 2010, the contents of all of which are incorporated herein by reference in their entirety.

TECHNICAL FIELD

The present invention relates to a mix for outer tyre portions of improved appearance.

Here and hereinafter, the term 'cross-linkable, unsaturated-chain polymer base' is intended to mean any uncured natural or synthetic polymer capable of assuming all the chemical, physical and mechanical characteristics typical of elastomers when cured with sulphur-based systems.

Here and hereinafter, the term 'curing agents' is intended to mean compounds which promote cross-linking of the polymer base, such as sulphur and possibly curing accelerants and aids.

Here and hereinafter, the term 'paraffin wax' is intended to mean a wax comprising petroleum-derived hydrocarbon chains, and the term 'natural wax' a wax comprising a mixture of organic compounds, such as esters, alcohol, saturated acids and natural hydrocarbons with 14-30 carbon atom chains, examples of which are beeswax, carnauba or montan wax.

Here and hereinafter, the term 'normal paraffin' is intended to mean a mixture of linear-chain hydrocarbons with a 15-70 carbon number, and the term 'non-normal paraffin' a mixture of hydrocarbons with branch or cyclic chains.

BACKGROUND ART

As is known, the mixes used to produce outer tyre portions also contain wax to protect the outside of the tyre from decay caused by the rubber reacting with ozone in the air. In fact, chemical attack by ozone is thought to be one of the main causes of ageing in tyres.

To counteract such ageing, mixes used to produce outer tyre portions contain wax, which protect the rubber from ozone attack by migrating to the surface and forming a protective film about the tyre.

Though successful in protecting the rubber from ozone attack, the wax solution has the drawback of the surface film impairing the look of the tyre, so considerable time and expense are incurred by tyre manufacturers and/or retailers in cleaning the tyres for sale.

Outer tyre portion mixes normally contain a standard paraffin wax comprising at least 60% by weight of normal paraffin.

Though satisfactory in terms of ozone protection, this standard wax does not always meet market demand in terms of appearance.

DISCLOSURE OF INVENTION

It is an object of the present invention to provide an outer tyre portion mix designed to ensure both effective ozone protection and improved appearance as compared with the known art.

According to the present invention, there is provided a tyre mix comprising a cross-linkable, unsaturated-chain polymer base, curing agents, a reinforcing filler, and wax; said mix being characterized in that said wax comprises a paraffin wax containing a maximum of 45% by weight of normal paraffin.

BEST MODE FOR CARRYING OUT THE INVENTION

In a preferred embodiment, the paraffin wax comprises a 40-60% by weight fraction of C15-C40 chains, at least 25% by weight of which comprises non-normal paraffin; and a 40-60% by weight fraction of C41-C70 chains, at least 50% by weight of which comprises non-normal paraffin.

In a preferred embodiment, said wax comprises a mix comprising said paraffin wax and a natural wax.

In another preferred embodiment, said wax comprises a mix comprising 1 to 6 phr of said paraffin wax containing a maximum of 45% by weight of normal paraffin, and up to 6 phr of said natural wax.

The following are non-limiting embodiments, purely by way of example, for a clearer understanding of the invention.

EXAMPLES

Five mixes (A, B, C, D, E) were prepared according to the present invention, and two comparison mixes (F, G), the first using standard wax in known manner, and the second using only natural wax.

Each mix was then tested to assess ozone protection and appearance.

Mixes A-G were prepared using the following procedure:
—Mix Preparation—
(1st Mixing Stage)
A 230-270-liter tangential-rotor mixer was first loaded with the cross-linkable polymer base, the wax, and all the other ingredients, except for the curing agents, to a fill factor of 66-72%.

The mixer was operated at 40-60 rpm speed, and the mix unloaded on reaching a temperature of 140-160° C.

(Optional 2nd Mixing Stage)
The mix from the first stage was mixed again in a mixer operated at 40-60 rpm speed, and was unloaded on reaching a temperature of 130-150° C.

(3rd Mixing Stage)
The curing agents were added to the mix from the preceding stage, to a fill factor of 63-67%.

The mixer was operated at 20-40 rpm speed, and the mix unloaded on reaching a temperature of 100-110° C.

Table I shows the compositions in phr of mixes A-E according to the present invention and prepared as described above.

TABLE I

|  | A | B | C | D | E |
| --- | --- | --- | --- | --- | --- |
| Natural rubber | 50 | 50 | 50 | 50 | 50 |
| Polybutadiene | 50 | 50 | 50 | 50 | 50 |
| CB | 50 | 50 | 50 | 50 | 50 |
| Stearic acid | 2 | 2 | 2 | 2 | 2 |
| T-DAE oil | 15 | 15 | 15 | 15 | 15 |
| ZnO | 4 | 4 | 4 | 4 | 4 |
| Antioxidant | 4 | 4 | 4 | 4 | 4 |
| Sulphur | 2 | 2 | 2 | 2 | 2 |
| Accelerants | 2 | 2 | 2 | 2 | 2 |
| Paraffin wax* | 3 | 3 | 3 | 3 | 3 |
| Natural wax | — | 2 | 4 | 6 | 8 |

Paraffin wax* is intended to mean paraffin wax containing a maximum of 45% by weight of normal paraffin, and the rest of branch- or cyclic-chain parafin.

More specifically, this particular paraffin wax comprises a 40-60% by weight fraction of C15-C40 chains, at least 25% by weight of which comprises non-normal paraffin; and a 40-60% by weight fraction of C41-C70 chains, at least 50% by weight of which comprises non-normal paraffin.

Table II shows the compositions in phr of comparison mixes F and G, also prepared as described above.

TABLE II

|  | F | G |
|---|---|---|
| Natural rubber | 50 | 50 |
| Polybutadiene | 50 | 50 |
| CB | 50 | 50 |
| Stearic acid | 2 | 2 |
| T-DAE oil | 15 | 15 |
| ZnO | 4 | 4 |
| Antioxidant | 4 | 4 |
| Sulphur | 2 | 2 |
| Accelerants | 2 | 2 |
| Paraffin wax** | 3 | — |
| Natural wax | — | 3 |

Paraffin wax** is intended to mean standard paraffin wax containing at least 60% by weight of normal paraffin, and the rest of branch- or cyclic-chain parafin.

—Laboratory Tests—

Each of mixes A-G was ozone protection tested as per ASTM procedure D1149, and appearance tested, to determine its lustre, as per ASTM Standard D523.

Table III shows the test results indexed with respect to comparison mix F containing only standard wax.

TABLE III

|  | A | B | C | D | E | F | G |
|---|---|---|---|---|---|---|---|
| Appearance | 120 | 140 | 150 | 160 | 160 | 100 | 160 |
| Ozone protection | 100 | 100 | 100 | 100 | 100 | 100 | 40 |

As shown clearly in Table III, the mixes according to the present invention provide for a considerable improvement in appearance, with no impairment in ozone protection.

Table III also shows how the paraffin wax* and natural wax combination provides for an even greater improvement in appearance.

In other words, the mixes according to the present invention provide for producing tyres, the outer portions of which are highly ozone-resistant, but with no impairment in appearance requiring time and expense to remedy the problems posed by the known art.

As will be obvious to anyone skilled in the art, the sidewalls are the outer portions of the tyre for which the mixes according to the invention are preferably designed.

The invention claimed is:

1. A tire mix comprising a cross-linkable, unsaturated-chain polymer base, curing agents, a reinforcing filler, and wax; wherein said wax comprises:
   2 to 6 phr of natural wax; and
   a paraffin wax containing a maximum of 45% by weight of linear-chain hydrocarbons with a 15-70 carbon number, and a 40-60% by weight fraction of $C_{15}$-$C_{40}$ chains, at least 25% by weight of which comprises non-normal paraffin, and a 40-60% by weight fraction of $C_{41}$-$C_{70}$ chains, at least 50% by weight of which comprises non-normal paraffin.

2. The mix as claimed in claim 1, wherein said wax comprises 1 to 6 phr of said paraffin wax containing a maximum of 45% by weight of linear-chain hydrocarbons with a 15-70 carbon number.

3. An outer tire portion, characterized by being made from the tire mix as claimed in claim 1.

4. The outer tire portion as claimed in claim 3, characterized by being a sidewall.

5. A tire comprising the outer tire portion as claimed in claim 3.

* * * * *